United States Patent [19]
Lewis

[11] 3,782,669
[45] Jan. 1, 1974

[54] CENTRIFUGAL ACTUATED MECHANISM WITH SEPARABLE MOUNTING BRACKET

[75] Inventor: John G. Lewis, St. Louis, Mo.

[73] Assignee: Emerson Electric Co., St. Louis County, Mo.

[22] Filed: Mar. 10, 1972

[21] Appl. No.: 233,580

[52] U.S. Cl............................. 248/14, 200/168 R
[51] Int. Cl.... H01h 3/16, H01h 15/14, H01h 17/12
[58] Field of Search..................... 248/14, 16, 300; 174/52, 58; 200/168 R, 67; 310/68 E

[56] References Cited
UNITED STATES PATENTS

| | | | |
|---|---|---|---|
| 3,433,907 | 3/1969 | Day............................. | 200/168 R X |
| 3,293,388 | 12/1966 | Slonneger..................... | 200/67 |
| 3,271,602 | 9/1966 | Waters......................... | 310/68 E |
| 2,952,430 | 9/1960 | Garman........................ | 248/26 |
| 2,896,045 | 7/1959 | Brunicardi.................... | 200/168 R X |
| 2,863,018 | 12/1958 | Rommel....................... | 200/168 R X |
| 2,794,092 | 5/1957 | Bengtsson.................... | 200/168 R X |

Primary Examiner—J. Franklin Foss
Attorney—Philip B. Polster et al.

[57] ABSTRACT

A mounting bracket assembly is provided for mounting peripheral equipment to an electric motor. The bracket is suited particularly for use with various motor types where a stator assembly and rotating member are supported by bearings fitted along end shield structures. More specifically, the bracket is advantageous where an electrical switch and motor protector are preassembled to it. The bracket thereafter is attached to the electric motor, and may be removed easily if the motor fails for any reason.

14 Claims, 22 Drawing Figures

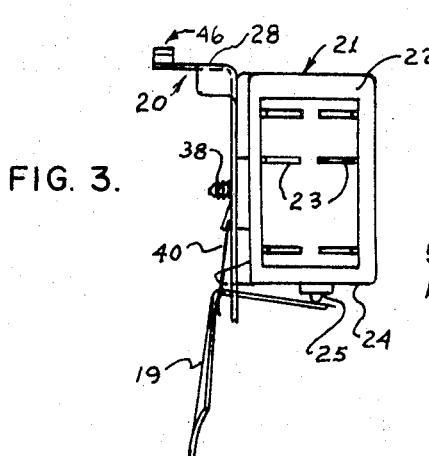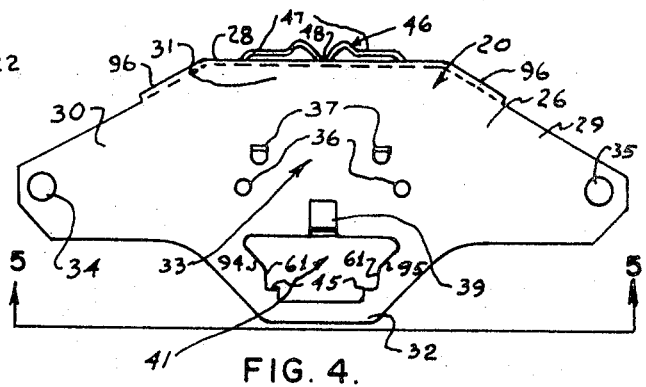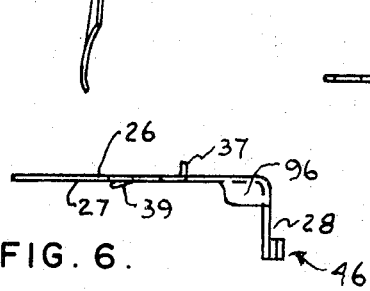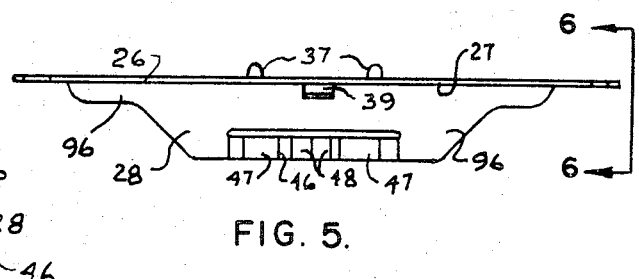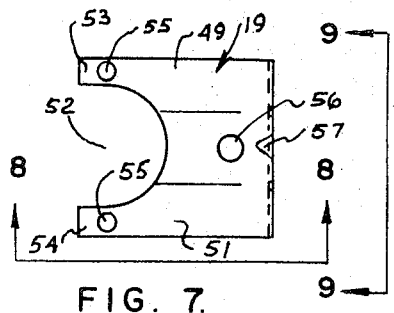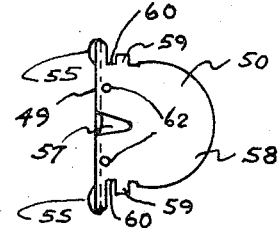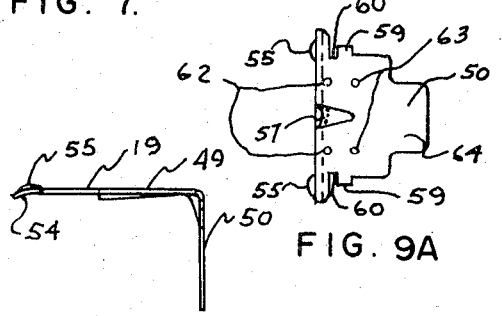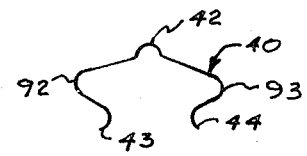

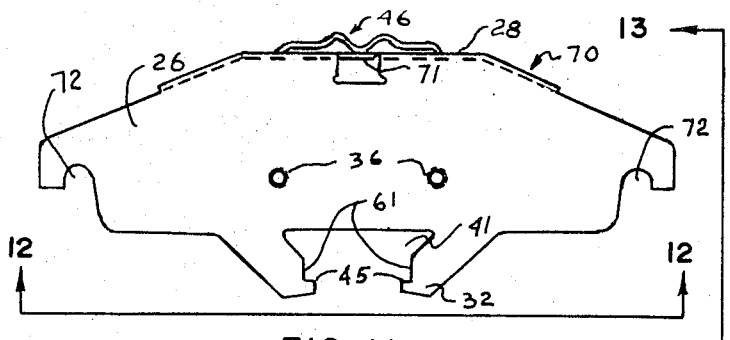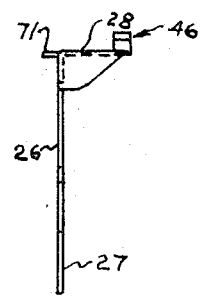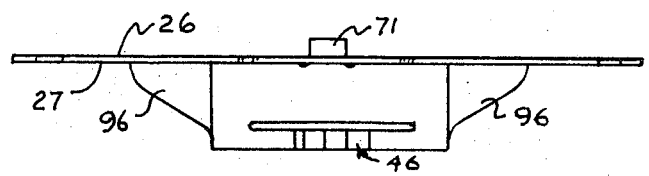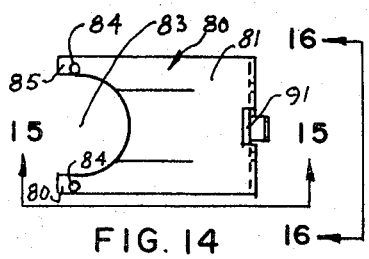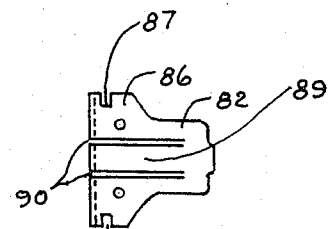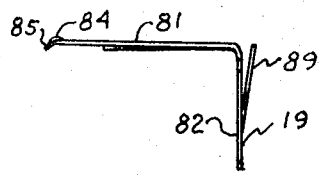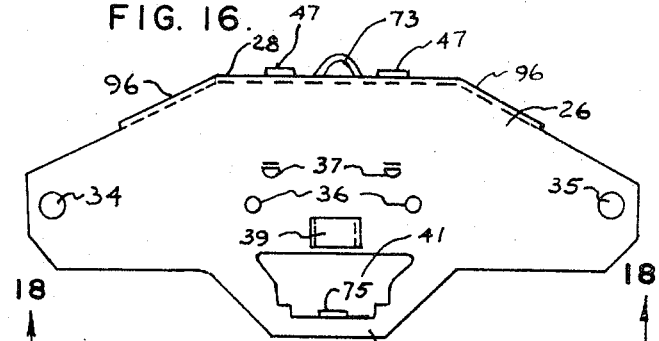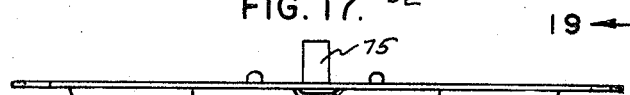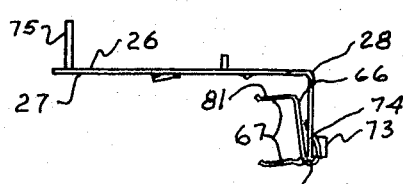

CENTRIFUGAL ACTUATED MECHANISM WITH SEPARABLE MOUNTING BRACKET

BACKGROUND OF THE INVENTION

This invention relates to mounting brackets and in particular to a mounting bracket adapted for use with an electric motor. Those skilled in the art will recognize the wide applicability of the bracket of this invention to other related situations where sensor or control elements, for example, are mounted to a primary assembly.

For many appliance and other equipment applications involving high volume unit production, such as furnace fans, blowers for air conditioners, washing machines, dryers and the like, original equipment manufacturers continually strive for cost reductions in their products.

One source for reducing cost is the dynamoelectric machine utilized in the product. In these applications, single phase induction motors having at least one main winding and an auxiliary or start winding of the resistance start split phase type conventionally have been used due to the economy inherent in their manufacture. These motors conventionally include an auxiliary or start winding wound to have a higher resistance than the main field winding, with the starting winding being physically displaced therefrom. Such motors frequently utilized a number of switches for selectively controlling a number of circuits. For example, in the aforementioned single phase induction motors, switches are employed to de-energize the start winding once the motor reaches a predetermined operating speed and may at the same time, selectively regulate other circuitry. One common way of effectuating the energization of the start winding in response to a predetermined motor speed is by a centrifugally actuated mechanism, responsive to the motor speed, which in turn opens the switch of a winding control switch unit in the circuit of the start winding when the motor attains the desired operating or running speed. Further background information on exemplary controls, along with examples of the prior art, is contained in the following U.S. patents: Waters, No. 3,271,602, issued Sept. 6, 1966; Slonneger, No. 3,293,388, issued Dec. 20, 1966; and Waters et al, No. 3,381,388, issued Apr. 30, 1968.

The systems disclosed and described in the aformentioned patents, for example, were developed for and worked well with certain forms of motor construction. In this construction, it is common to assemble motors, and particularly split phase induction motors, so as to enclose the stator assembly and its associated rotor and shaft in a pair of end shield or frame members. The stator assembly conventionally includes a single phase main winding and a start winding arranged in slots provided in the stator and these windings cause currents to be induced in a squirrel cage winding arrangement in slots of the motor rotor. The rotor conventionally is carried on a shaft rotatably supported by the end shields and suitably lubricated bearings. Both the stator assembly and the end shields conventionally have a series of bolt holes in them, which, when properly arranged, allow insertion of bolts through the end shield and stator assembly, and permits the attachment of the end shields to the stator assembly by some type of conventional locking means.

While a great many dynamoelectric machines still utilize this bolted construction, more recent developments in motor construction have evolved utilizing an epoxy resin for holding the end shields to the stator core. Details of this construction may be obtained by referring to the following U.S. patents: Thompson et al. No. 3,165,816, issued Jan. 19, 1965; Wightman et al. No. 3,343,013, issued Sept. 19, 1967; Royer et al. No. 3,378,709, issued Apr. 16, 1968; Arnold No. 3,437,853, issued Apr. 8, 1969; and Lewis No. 3,489,934, issued Jan. 13, 1970.

During the development of the cemented motor, certain techniques utilized with the older form of assembly were adopted in the new method. In particular, concepts for mounting the above mentioned switch assembly continued to be applied under cemented motor construction principles. That is, the switch assembly was mounted directly to the end shield structure, and some type of mechanism was placed through the end shield to control the switch in response to motor speed. This mounting method has serious deficiencies heretofore unresolved, caused by the nature of materials necessary for cemented motor construction. The epoxy utilized in cemented construction requires a cure cycle conventionally of high temperature in order to permit fast cure, thereby attaining high volume prduction of motor assemblies. With the majority of end shield designs in the prior art, it is necessary to attach some of the components, for example, the mechanism used to control the switch in response to motor speed, prior to the cure cycle. This placement is necessary because the various components used to operate the switch in the form of the above mentioned centrifugal actuator are dependent on the end shield and its relative position in the motor assembly. The end shield designs necessitated by switch attachment thereto do not lend themselves to easy assembly methods for the other components necessary for switch operation once the end shield placement is fixed, as is the case after cure.

It has been found that the submission of the switch assembly to the cure cycle causes malfunctioning of the switch assembly, in some instances, after cure. The switch assembly construction is not always suitable to the high temperature encountered in cure cycles that allow maximum production nor are the other structural components compatible with these higher cure cycle temperatures. Consequently, motor production rates have been restricted heretofore by secondary considerations including the construction of the various structural components comprising the centrifugally operated switch mechanism.

The cemented motor does not lend itself to repair of motor defects. That is, when motors are checked from the production line, for example, in a quality control program, they may be inoperable. Many of the inoperability causes are correctable if access can be gained to the stator assembly. A body of art has developed going to the fact that the cemented motor becomes an integral unit after cure but thus far all such correctional procedures are accomplished remote from the production line. This in turn means that the components of the switch assembly are lost to the motor manufacturer unless the motor can be repaired easily or until the motor is destroyed and the related components are removed. I have developed a mounting assembly which is removable from the motor and is independent of the end shield. The assembly permits the mounting of the switch and its related components as a preassembled unit. This unit in turn may be mounted on the motor after the cure cycle. Consequently, the bracket may carry, along with the switch, any associated motor protector. Since the switch and its related mechanism can be attached independently of the end shield, end shield design becomes highly flexible with mere skeleton frames sufficient in many applications. Motors may be checked for malfunction prior to bracket mounting and defective units can be removed from the production line before additional assembly time and expense are incurred.

One of the objects of this invention is to provide a low cost mounting assembly for an electrical switch.

Another object of this invention is to provide a mounting assembly having an integrally formed area for attaching an external motor protector.

Another object of this invention is to provide a mounting assembly for an electrical switch that is independent of end shield construction.

Yet another object of this invention is to provide an improved lever for use with the mounting assembly wherein the lever arm has an integrally constructed spring construction.

Yet another object of this invention is to provide a positive bias for the actuator-electrical switch structural chain used in a split phase motor, for example, through improved lever construction.

Still another object of this invention is to provide an improved centrifugal switching mechanism.

Other objects of this invention will become apparent to those skilled in the art in view of the following description and accompanying drawings.

SUMMARY OF THE INVENTION

In accordance with this invention generally stated, a mounting bracket is provided for use with an electric motor. The bracket provides a mounting surface for an electrical switch and related switch operating mechanisms. The bracket also may provide a mounting surface for an associated external motor protector.

In the preferred embodiment, the mounting bracket assembly includes a lever arm for actuating a plunger type of motor switch. The preferred embodiment further utilizes a lever having a self-contained, integral spring which biases the lever against the switch assembly. The lever is operated by a centrifugal mechanism responsive to the motor speed.

BRIEF DESCRIPTION OF THE DRAWINGS

In the drawings.

FIG. 3 is a view taken along the line 3—3 of FIG. 1 simplified to show the mounting assembly of FIG. 1 in side elevation;

FIG. 4 is a view in front elevation of one illustrative embodiment of mounting assembly of this invention;

FIG. 5 is a bottom plan view taken along the line 5—5 of FIG. 4;

FIG. 6 is a view in side elevation taken along the line 6—6 of FIG. 5;

FIG. 7 is a view in front elevation of one illustrative embodiment for lever assembly illustrated in FIG. 3;

FIG. 8 is a view in side elevation taken along the line 8—8 of FIG. 7;

FIG. 9 is a top plan view taken along the line 9—9 of FIG. 7;

FIG. 9a is a top plan view of a second illustrative embodiment for lever assembly illustrated in FIG. 7;

FIG. 10 is a view in front elevation of the spring utilized with the lever of FIG. 7;

FIG. 11 is a view in front elevation of a second illustrative embodiment of mounting assembly of this invention;

FIG. 12 is a bottom plan view taken along the line 12—12 of FIG. 11;

FIG. 13 is a view in side elevation taken along the line 13—13 of FIG. 11;

FIG. 14 is a view in front elevation of a third illustrative embodiment of lever used in conjunction with mounting assembly of this invention;

FIG. 15 is a view in side elevation taken along the line 15—15 of FIG. 14;

FIG. 16 is a top plan view taken along the line 16—16 of FIG. 14;

FIG. 17 is a third illustrative embodiment of mounting assembly of this invention;

FIG. 18 is a bottom plan view taken along the line 18—18 of FIG. 17;

FIG. 19 is a view in side elevation taken along the line 19—19 of FIG. 18;

DESCRIPTION OF THE PREFERRED EMBODIMENT

Figure 1:
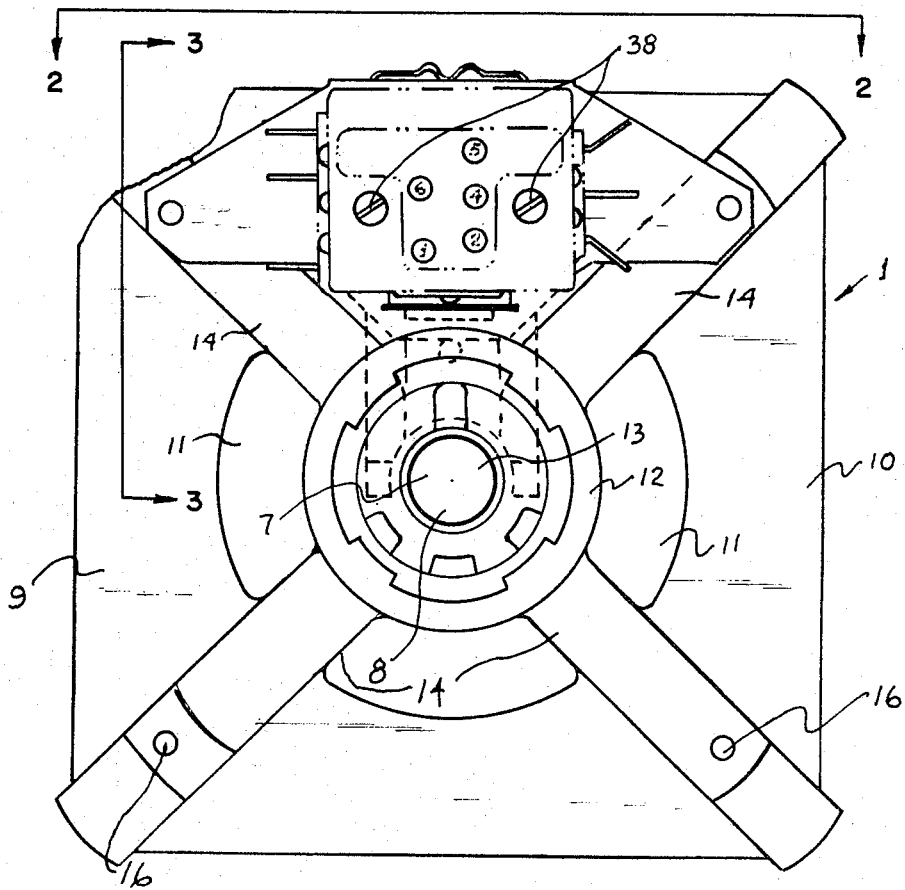
FIG. 1 is a view in end elevation of one illustrative embodiment of mounting assembly of this invention shown in its motor mounted position.
Figure 2:
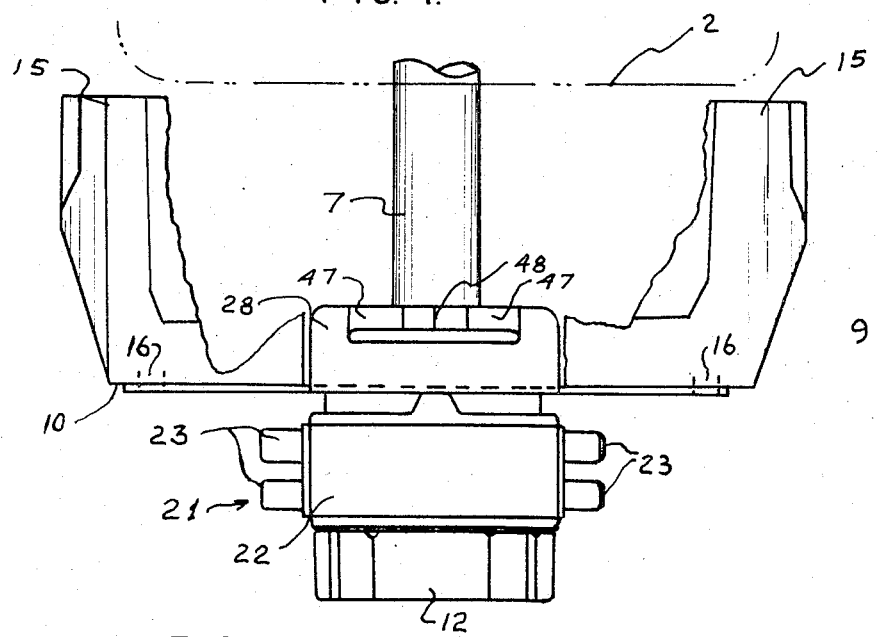
FIG. 2 is a top plan view taken along the line 2—2 of FIG. 1.
Figure 20:
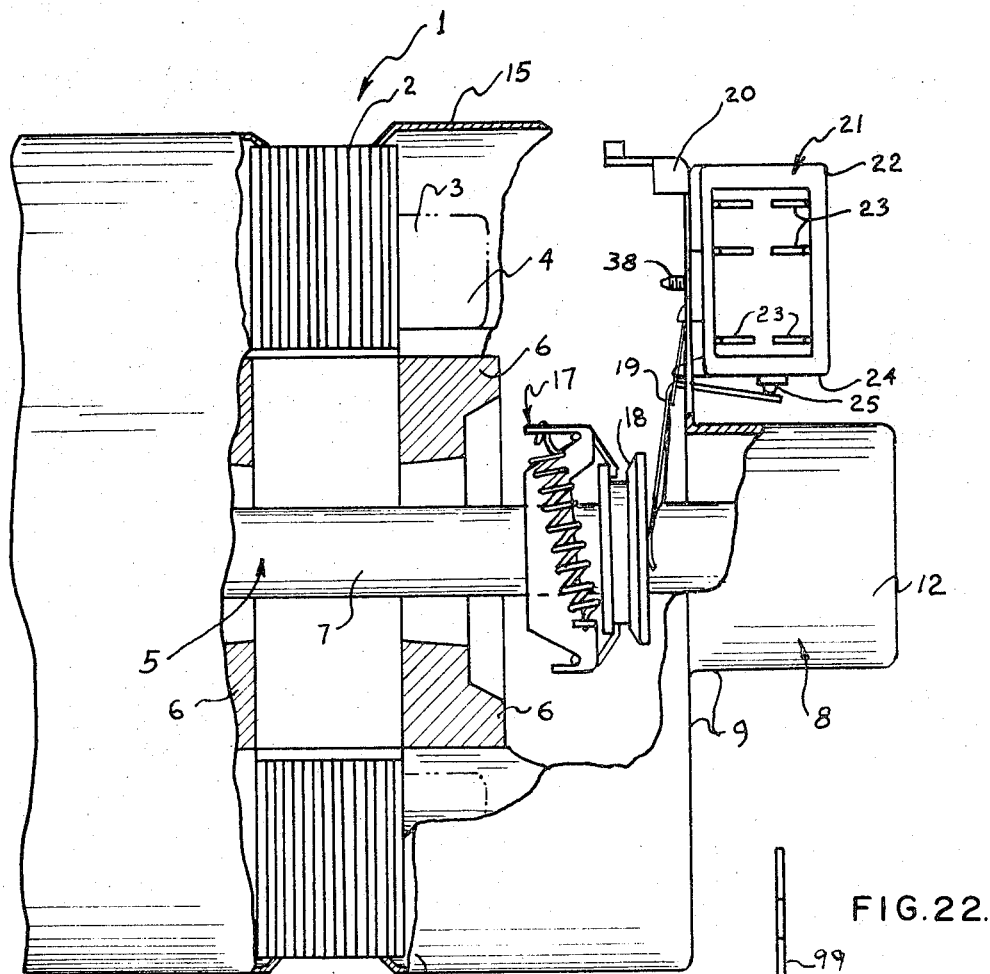
FIG. 20 is a view in perspective illustrating the centrifugal actuator system of this invention.

Referring now to FIGS. 1 and 20, reference numeral 1 indicates a motor having a laminated core 2 of magnetic material. The core 2 has an axial opening through it and has a plurality of slots arranged annularly about the opening. The slots have at least a main winding 3 and an auxiliary winding 4 disposed in them and arranged to define electrical poles for motor operation. The core opening contains a rotor assembly 5 which conventionally is of a squirrel cage design and includes an end ring 6 at each end of the rotor assembly. Rotor assembly 5 has an axial opening through it which is used to mount the rotor on a shaft 7. Shaft 7 is supported on each end by a suitable bearing means indicated generally at 8 which are carried by an end shield 9 along each of the shaft. The stator-rotor combination may be mounted within a housing not shown, or the end shield may be mounted directly to the core 2. As illustrated, end shield 9 and core 2 are joined by an epoxy adhesive applied between a plurality of legs 15 and the core 2.

The end shield 9 may assume a variety of configurations. In the embodiment illustrated in FIG. 1, end shield 9 includes a front 10 having a plurality of openings 11 in it. The design of the end shield 9 and in particular the size and shape of openings 11, may vary greatly. My invention is particularly suited for end shields comprising substantially only a skeleton structure. The openings 11 or the open areas of a skeleton structure are used to allow rapid air cooling of motor 1. End shield 9 has a central hub 12 having an axial opening 13 through it. A plurality of spokes 14 extend from the hub 12 and give structural rigidity to the end shield construction. The legs 15 extend from the front 10, generally being perpendicular to it. The legs 15 are utilized to mount the end shield structure to the core 2, as previously described. Front 10, in the embodiment illustrated, has four bolt holes 16 from and through it. The holes 16, while not necessary with a cemented construction, make the end shield 9 compatible in a bolted assembly process and they are useful in mounting the switch assembly bracket described hereinafter.

It is common to mount a speed responsive actuating device 17 on one end of the shaft 7. Speed responsive actuating device 17 is conventional and various forms of commercial actuators are available. Commonly, they assume at least two positions corresponding to a first and a second rotor speed. Device 17 has an end or collar 18 adapted to contact a lever 19 in at least one of the speed responsive positions.

Shown in FIG. 3 is one illustrative embodiment of mounting bracket of this invention. As there illustrated, a bracekt assembly 20 has an external switch 21 mounted to it. Lever 19 is utilized to actuate the switch.

Switch 21 is conventional. In general, such external switches include a casing 22 having a plurality of contact arms 23 extending from opposite side walls of casing 22. A bottom 24 has a plunger 25 extending through it. The plunger 25 reciprocates within the switch cavity delimited by casing 22 to engage and disengage alternately various contact arms 23. Various types of switches 21 are known in the art, and the operation of the switch 21 in and of itself forms no part of this invention.

Bracket assembly 20 comprises a mounting surface 26, a rear side 27, and a top wall 28. Assembly 20 is L-shaped in side elevation as is best seen in FIGS. 3 and 6. The mounting surface 26 and its corresponding rear side 27 form the long leg of the L. Mounting surface 26, in the illustrated embodiment, is essentially planar, and generally trapezoidal in plan. Other shapes or sizes may be utilized. The trapezoidal shape has been found to be particularly well adapted to manufacturing and instalation. Manufacturing is facilitated because the shape allows maximum material utilization with minimum material waste. That is, where assembly 20 is punched from sheet metal, for example, its particular shape works well in a progressive die process and the assembly can be arranged to give maximum material utilization. Instalation is facilitated because the general trapezoidal shape can be adapted to a variety of standard NEMA motor frame sizes and when attached to the motor, presents a low, streamlined and compact silhouette.

Surface 26 generally has a first end 29, a second end 30, a top 31, a bottom 32, and a mid area 33. Ends 29 and 30 have openings 34 and 35 respectively through them. The openings 34 and 35 are utilized to attach bracket assembly 20 to its associated motor, as is demonstrated in FIG. 1. Mid section 33 has a pair of spaced perforations 36 from and through the surfaces 26 and 27. Perforations 36 are designed and predeterminedly spaced to permit mounting of switch 21 by inserting a pair of conventional screws 38 through the casing 22 of switch 21 and into the perforations 36. Positioned near perforations 36 are two indicating notches 37. Notches 37 need not be utilized in all embodiments of my invention. However, with the switch 21 illustrated in the drawings, the notches 37 are convenient means for locating the switch. That is, a portion of casing 22 abuts the notches 37 and permits easy alignment of perforations 36 with openings, not here shown, through casing 22 of switch 21, which is needed for the switch 21 attachment previously described.

Also located along mid area 33 is a spring couple 39. Spring couple 39 is a rectangular lanced portion driven from the surface 26 toward the side 27 of bracket assembly 20. Spring couple 39 is utilized to position and hold spring 40, the function of which is described in detail hereinafter.

Spring 40 is of an open ended, serpentine design and is shown individually in FIG. 10. Spring 40 has a protrusion 42 which is inserted in and functionally held by the spring couple 39, and has a first end 43 and a second end 44. Ends 43 and 44 are designed for insertion into lever arm 19. The serpentine design of the spring 40 permits a bend 92 and a bend 93 to abut the surface 26 of bracket assembly 20, which I have found to be an important consideration described in detail hereinafter.

Positioned below spring couple 39, along the bottom 32 is a lever opening 41. Opening 41 resembles a truncated, inverted triangle having its base near spring couple 39. As may be observed in FIG. 4, opening 41 distorts the overall trapezoidal design of mounting surface 26. A side 94 and a side 95 of opening 41 is structured to form a vertical rise 61 and a pivot edge 45. Lever arm rests on edge 45 and is free, within limits, to pivot on and about the edge 45. While the shape, size, and design of opening 41 may vary, the particular opening shown and described was chosen because the lever 19 can be positioned in it very quickly, as is later related in detail.

Top wall 28 is formed integrally with the surface 26 and is perpendicular thereto. Again the design of the wall 28 may vary in other embodiments of the invention. It has been found convenient to utilize the wall 28 for mounting a protector assembly, not shown. Various commercial protectors are utilized with motors and are designed to open the power line for the motor under certain conditions including over temperature, over current, or a combination of both. It is conventional for these protectors to have mounting clips and one such clip is shown in conjunction with the bracket illustrated in FIGS. 18 and 19 and is designed by the reference numeral 65. In order to accommodate these clips and their associated protector, it has been found convenient to form a protector mounting 46 from and raised above the plane of the wall 28. The protector mounting 46 includes a pair of essentially flat surfaces 47 with a V-notch 48 between them. The surfaces 47 are designed to accept a clip-on bracket for the protector while the V-notch is designed to abut the protector assembly. The V-notch, in effect, acts as a clamp to ensure a tight, friction fit of the protector and the top wall 28.

In the embodiment of FIG. 4, top wall 28 defines a tab area 96 on each side of mounting 46. Tab area 96 permits the placement of electrical wires, not shown, between the switch 21 and any associated protector without fear of insulation wear, caused by normal motor vibrations, between the wire and sharp edges of bracket assembly 20 acting to cause wire insulation breakdown.

Referring to FIG. 8, it is observed that the lever 19 is L-shaped in side elevation, having a long leg 49 and a short leg 50. Leg 49, shown in FIG. 7, includes a broad rectangular area 51 having an open mouth channel 52 through it. The channel 52 permits the passage of motor shaft 7 and forms a contact part 53 and a contact part 54 along each side of the channel 52, near the open mouth of the channel. The contact parts 53 and 54 are bowed slightly, as is best seen in FIG. 8. A pair of wear pads 55 are formed on each contact part, near the bow of those areas. Pads 55 are designed to contact the collar 18 of the centrifugal actuating device 17 during operation of the centrifugal mechanism described hereinafter. The area 51, in the embodiment illustrated in FIG. 7, has an index opening 56 in it which is necessary in the particular lever 19 manufacturing process but serves no function under the broader aspects of my invention. Other embodiments of my invention may eliminate the index opening 56 or position it elsewhere on the lever 19. Leg 50 is manufactured integrally with leg 49, and later formed by bending a portion of the lever 19 so as to define a second, perpendicular surface. A stress relief notch 57 may be useful, or even necessary for proper forming of the leg 50. Leg 50 may assume a variety of configurations, and two such configurations are illustrated in FIGS. 9 and 9a. The embodiments of FIGS. 9 and 9a are intended for use with the separate spring of FIG. 10, previously described. Another embodiment of lever 19 having an integral spring is described in detail hereinafter.

Referring now to FIG. 9, leg 50 is shown as including a broad, plunger contact area 58. Plunger area 58 is designed to abut the plunger 25 as illustrated in FIG. 3, in the operation of lever 19. Area 58 has at least one lip pair 59 formed integrally with it, near the integral junction of the legs 49 and 50. Also indicated in FIG. 9 are index notches, along a side of the lips 59 opposite a pair of recesses 60. The index notches are not assigned a reference numeral, their function being one of die direction in the forming of the lever 19.

The recesses 60 are designed to admit and their edges to engage the bracket assembly 20 along the pivot edge 45-vertical rise 61 portion of opening 41. That is, the lever 19 rests along the pivot edge 45 while the edges of recesses 60 engage the vertical rise 61. The recesses 60-rise 61 engagement is sufficient to lock the lever arm 19 within the opening 41. As previously described, the opening 41 may assume a variety of shapes. The particular configuration illustrated is particularly suitable for insertion of leg 50 and the engagement of the vertical rise 61 within the recesses 60. When so positioned, the lever 19 is free to rotate about the pivot edge 45 and is retained as described above.

Plunger area 58 has a pair of openings 62 near the edge defining the integral legs 49 and 50. Openings 62 receive the ends 43 and 44 of spring 40.

The embodiment of FIG. 9a illustrates a slightly different design for contact area 58. Like parts have like numerals in FIGS. 9 and 9a. In FIG. 9a, however, a second pair of openings 63 are placed through a contact area 64. Contact area 64 also has a different silhouette from the contact area 58. The particular shape or design for the silhouette of the plunger contact areas does not form a part of this invention. The openings 63, however, like the openings 62, may be used to accept the ends 43 and 44 of spring 40. It may be seen by observing the relative positions of opening pair 62, recess 60 and opening pair 63, that the spring 40 may be suspended between the couple 39 and the openings pair 62 and 63 so that the spring 40 is entirely on the rear side 27 of bracket assembly 20 when the spring ends are in the opening 62 position or the spring 40 can be altered to pass through the opening 41 to the side 26 of bracket 20 if the spring ends are placed in the opening 63 position. This variation of spring 40 position is important. With the ends 43 and 44 of spring 40 placed in the opening pair 62, lever 19 is biased toward plunger 25. With the ends 43 and 44 of spring 40 placed in the openings 63, lever 19 is biased away from plunger 25. Prior art in the area of my invention, including Waters et al., No. 3,381,147, mentioned above, indicates that it is desirable to bias the lever 19 away from the plunger 25 so that the speed responsive arrangement thereby prevents unnecessary recycling of components. I have found it entirely satisfactory if not extremely desirable, to bias the lever 19 toward the plunger 25. The lever of this invention is compatible with either design theory, however.

FIG. 11 illustrates a second embodiment of mounting bracekt of this invention, indicated generally by the numeral 70. Bracket 70 is similar to bracket 20 in function and similar reference numerals are utilized where applicable, but the bracket 70 varies in certain constructional details and described hereinafter. First, a locating notch 71 is punched from the side 27 toward the surface 26 near to top wall 28. Locating notch 71 functions similarly to the locating notch pair 37 of the embodiment shown in FIG. 4 but it abuts a different part of casing 22. Open ended bolt hole pair 72 again the functional equivalent of bolt holes 34 and 35 of the previous embodiment, are used. The open end hole pair 72 permits easier instalation of the bracket in certain circumstances, for example, where conventional screws are pre-inserted in the holes 16 of end shield 9. Finally, the opening 41 extends through the bottom 32 and is particularly adapted for use with a lever arm 80 illustrated in FIG. 14, and later described in detail.

FIGS. 17 through 20 illustrate a third embodiment of mounting bracket of this invention. The bracket there illustrated is similar to those of FIGS. 4 and 11, with the exception of the method utilized in attaching the protector clip 65. Similar reference numerals are used where applicable. Clip 65 is conventional and commercially available in a number of shapes and designs. Clip 65 includes a base 66 having a jaw pair 67 formed integrally with the base 66 and perpendicular to it. A pair of arms 74 also is formed integrally and parallel to the base 66, but are spaced therefrom except along an attaching edge 68. As is best seen in FIG. 17, a V-notch 73 is similar to the notch 48 but is inverted. The arms 74 of the clip 65 are bent over and around the surface 47 so as to terminate below the plane of top wall 28 in order to attach the clip 65. This differs from the previous embodiment as the arms 74 normally merely abut the surfaces 47 so as to hold the clip 65 along the under side of top wall 28. The method of attachment of this embodiment is used where the protector and clip 65 might be subject to sustained and hard vibration in use. Additionally, a supporting means 75 is provided along bottom 32, near the opening 41. Supporting means 75 is formed from the side 27 toward the side 26 of the bracket assembly and gives additional support to any lever arm used in conjunction with the bracket of this invention.

Referring now to FIG. 14, a third illustrative embodiment of lever arm of this invention is shown generally by reference numeral 80. Lever arm 80 is L-shaped in plan having a long leg 81 and a short leg 82. Leg 81 is similar in design and appearance to the leg 49 of lever arm 19, in that an opening 83, a wear pad 84 and a contact part 85 have a similar function and structure in lever arm 19. Likewise, leg 82 includes a lip part 86, recesses 87, and contact area 88, all of which have functional and structural equivalents in the other embodiments of lever of this invention. The significant structural change in the lever arm 80 is the incorporation of integral spring 89. Spring 89 is formed from leg 82 by cutting a pair of channels 90 through that leg, and separating the resulting band from the leg 81 along a notch 91. The resulting cantilever arm-like structure is bent from the plane of leg 82, as is best illustrated in FIG. 15. In use, lever arm 80, when positioned in opening 41 as previously described, acts against casing 22 of switch 21 to bias contact area 88 toward the collar 18, enabling the lever arm 80 to release the plunger 25 in at least one position of actuating device 17.

Figure 21:
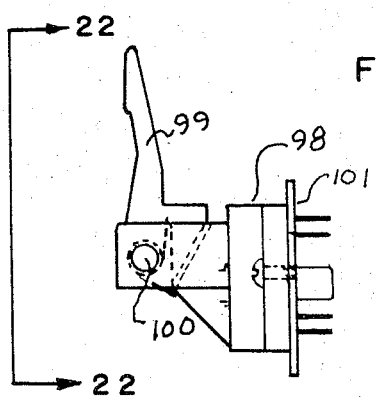
FIG. 21 is a view in side elevation of yet another illustrative embodiment mounting assembly of this invention.
Figure 22:
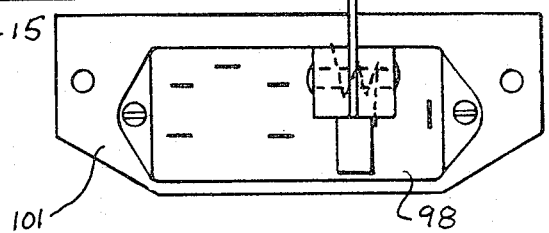
FIG. 22 is a view taken along the line 22—22 of FIG. 21.

Numerous variations, within the scope of the appended claims, will occur to those skilled in the art in light of the foregoing description and accompanying drawings. Thus, one or more features of one illustrative embodiment may be incorporated in another of the embodiments. For example, the design of opening 41 illustrated in FIG. 11 may be incorporated with the design illustrated in FIG. 4. Or, the bolt hole pair 72 design may be utilized with the other embodiments illustrated. Likewise, the design of the notch 73 may be interchanged with the construction of the notch 48. The lever 19 or 80 may be interchanged. While the bracket 20, for example, has been described as a stamped metal part, other materials may be utilized in its construction. Thus, a low cost design may utilize molded plastic or aluminum. Various other switch designs may be utilized with the bracket of this invention, the design illustrated in the drawings and described under the designation of reference numeral 21 merely being exemplary of the numerous commercial designs presently available. For example, certain switches include an integrally assembly lever arm and one such illustrative switch assembly is shown in FIG. 21 and represented by the numeral 98. As there shown, switch 98 includes a lever 99 connected to the switch 98 along a pivot point 100. In embodiments using a switch 98, or its equivalent, the bracket of this invention only need be a single surface 101. Likewise, the design of the protector clip 65 may be varied, as may the method of attaching the clip to the mounting assembly of this invention. Other designs for the lever arms illustrated can be constructed utilizing the principles disclosed above. Other methods of attaching the bracket assembly of this invention to the motor may be used. For example, the bracket may be welded or glued to the motor, although some flexibility is lost with these methods. While the bracket is described for use with both a switch and a protector, th single surface 26 may comprise the bracket in applications where a protector is not utilized. Those skilled in the art will recognize that the surface 26 may be constructed integrally with the casing 22 of the switch 21, if desired. These variations are merely illustrative.

Having thus described the invention, what is claimed and desired to be secured by Letters Patent is:

1. A bracket assembly for attaching external motor control components to a motor, which comprises:

a first surface adapted for mounting at least one motor control component thereto, said surface having a first end, a second end, a top edge and a bottom edge, said first surface having at least one opening in it, near one of said top and said bottom edges;

a second surface perpendicular to said first surface and attached thereto along the other of said top and said bottom edges, said second surface adapted to mount at least one motor control component thereto; and a lever arm pivotally supported by said first surface and extending through said opening in said first surface, said lever arm being L-shaped in side elevation, said lever having an integrally formed spring in one of the legs of said L-shape, said spring comprising a band of material separated from said leg and bent from the plane of said leg.

2. A bracket assembly for attaching motor control components to a motor including an electrical switch having an external plunger portion for operating said switch, comprising:

a mounting surface adapted for mounting said switch to said bracket, said surface having at least one opening in it near the location of said external plunger portion; and a lever arm pivotally supported by said mounting surface, said lever arm being substantially L-shaped in side elevation, said lever arm extending through said opening in said mounting surface, one of the legs of said L-shape defining a plunger contact area which abuts said external plunger portion, said last mentioned leg having an integrally formed spring in it, said spring comprising a band of material separated from said leg and bent from the plane of said leg.

3. The bracket assembly of claim 2 wherein said mounting surface has a supporting means extending perpendicularly outwardly from it near said opening, said supporting means adapted to support said lever arm.

4. A bracket assembly for attaching motor control components to an electrical motor, including an electrical switch having an external plunger portion for operating said switch, comprising:

a mounting bracket having a first side and a second side adapted for mounting said switch to said bracket, said bracket having at least one opening in it near the location of said external plunger portion of said switch;

a lever arm pivotally supported by said bracket, said lever arm being L-shaped in side elevation, having first and second legs, one of said first and said second legs defining a plunger contact area which abuts said external plunger portion of said switch; and a spring mounted between said mounting bracket and said lever arm biased so as to exert a force on said lever arm toward engagement of said plunger contact area and said external plunger portion of said switch.

5. The bracket assembly of claim 4 wherein said mounting bracket comprises a first surface adapted for mounting said electrical switch thereto, said surface having a first end, a second end, a top edge and a bottom edge, said first surface having at least one opening in it, near one of said top and said bottom edges and a second surface perpendicular to said first surface and attached thereto along the other of said top and said bottom edges, said second surface having a slit formed in it to define a strip, said strip having a V notch in it formed in a plane other than the plane of said second surface.

6. The bracket assembly of claim 5 wherein said first surface includes at least one locating means for positioning said motor control components along said first surface.

7. The bracket assembly of claim 6 wherein said opening in said first surface is in the form of an inverted, truncated triangle, at least one side of said triangle having a vertical rise part and a horizontal edge part formed in it.

8. The bracket assembly of claim 7 wherein each of said first and said second ends of said bracket assembly have an opening in them for mounting said bracket to said motor.

9. A bracket assembly for attaching motor control components to a motor having a shaft, said motor control components including an electrical switch having a movable switch element for actuating said switch, comprising:
   a bracket, said bracket having said switch mounted to it, said bracket being adapted for mounting to said motor;
   a lever operatively engaged with one of said bracket and said switch, said lever including a portion extending radially from said shaft, said radial portion when urged in an axial direction causing a pivotal movement of said lever toward a position that effects the displacement of the switch element to actuate the switch; and
   means for spring loading said lever so as to exert a force in an axial direction thereby biasing said lever toward said displacement effecting position.

10. The assembly of claim 9 wherein said spring means comprises a spring mounted between said bracket and said lever.

11. The assembly of claim 10 wherein said bracket has a spring couple formed in it for attaching said spring to said bracket.

12. The assembly of claim 9 wherein said spring means is integrally formed with said lever, said spring means comprising a band of material separated from said lever and bent from the plane of said lever.

13. The assembly of claim 12 wherein said bracket includes a lever support extending perpendicularly outwardly from it, adapted to support said lever.

14. A bracket assembly for attaching motor control components to a motor including an electrical switch having an external plunger portion for operating said switch, comprising:
   a mounting surface adapted for mounting said switch to said bracket, said surface having at least one opening in it near the location of said external plunger portion; and
   a lever arm pivotally supported by said mounting surface, said lever arm including a leg extending through said opening in said mounting surface, said leg defining a plunger contact arm which abuts said external plunger portion, said leg having an integrally formed spring in it, said spring comprising a band of material attached to said leg and extending outwardly from the plane of said leg.

* * * * *